United States Patent
Sun et al.

(10) Patent No.: US 10,659,244 B2
(45) Date of Patent: May 19, 2020

(54) MULTICAST PROFILE SWITCHING METHOD, APPARATUS, AND SYSTEM

(71) Applicant: Huawei Technologies Co., Ltd., Shenzhen (CN)

(72) Inventors: Yanbin Sun, Wuhan (CN); Tao Ouyang, Wuhan (CN); Lifan Xu, Wuhan (CN); Li Zhang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 150 days.

(21) Appl. No.: 16/019,183

(22) Filed: Jun. 26, 2018

(65) Prior Publication Data

US 2018/0316515 A1 Nov. 1, 2018

Related U.S. Application Data

(63) Continuation of application No. PCT/CN2015/099905, filed on Dec. 30, 2015.

(51) Int. Cl.
*H04L 12/18* (2006.01)
*H04N 21/6405* (2011.01)
(Continued)

(52) U.S. Cl.
CPC ........ *H04L 12/185* (2013.01); *H04L 12/2801* (2013.01); *H04L 47/15* (2013.01);
(Continued)

(58) Field of Classification Search
None
See application file for complete search history.

(56) References Cited

U.S. PATENT DOCUMENTS 7,701,938 B1 * 4/2010 Bernstein ............... H04L 47/10
370/270
7,983,162 B1 * 7/2011 Ford ................... H04L 41/0893
370/232

(Continued)

FOREIGN PATENT DOCUMENTS

| CN | 101645784 A | 2/2010 |
| CN | 103875240 A | 6/2014 |
| CN | 104837070 A | 8/2015 |

OTHER PUBLICATIONS

Data-Over-Cable Service Interface Specifications, DOCSIS® 3.1. Physical Layer Specification, CM-SP-PHYv3.1-I07-150910, © 2013-2015 Cable Television Laboratories, Inc., 244 pages.

(Continued)

*Primary Examiner* — Alexander Q Huerta
(74) *Attorney, Agent, or Firm* — Slater Matsil, LLP

(57) ABSTRACT

Embodiments of the present invention provide a multicast profile switching method. In the method, using a multicast profile management module, a multicast profile switching request message is received from a cable modem termination system CMTS. A multicast profile having a maximum rate and commonly supported by all current multicast group members is determined. When the multicast profile having the maximum rate is different from a current multicast profile that is running, a multicast profile switching instruction is sent to the CMTS, where the multicast profile switching instruction is used to instruct the CMTS to perform multicast profile switching.

15 Claims, 3 Drawing Sheets

---

S401 — A CMTS determines, when a multicast group member managed by the CMTS changes, a multicast profile having a maximum rate and commonly supported by all current multicast group members S403 — When the multicast profile having the maximum rate is different from a profile running in a current multicast group, test, in the current multicast group, whether all multicast group members support the multicast profile having the maximum rate S405 — Send a determining result to a profile management module when determining that all the multicast group members support the multicast profile having the maximum rate S407 — The profile management module sends a multicast profile switching instruction to the CMTS according to the determining result, to instruct the CMTS to perform multicast profile switching

(51) Int. Cl.
*H04N 21/61* (2011.01)
*H04L 12/28* (2006.01)
*H04L 12/801* (2013.01)
*H04L 29/08* (2006.01)

(52) U.S. Cl.
CPC ......... *H04L 67/30* (2013.01); *H04N 21/6118* (2013.01); *H04N 21/6168* (2013.01); *H04N 21/6405* (2013.01)

(56) References Cited

U.S. PATENT DOCUMENTS

| | | | | |
|---|---|---|---|---|
| 2005/0281265 | A1* | 12/2005 | Sakamoto | H04L 12/185 370/390 |
| 2008/0062948 | A1* | 3/2008 | Ponnuswamy | H04W 28/18 370/342 |
| 2009/0122846 | A1 | 5/2009 | Kolze et al. | |
| 2009/0147786 | A1 | 6/2009 | Li et al. | |
| 2011/0188439 | A1 | 8/2011 | Mao et al. | |
| 2012/0039173 | A1* | 2/2012 | Danzig | H04L 12/2801 370/235.1 |
| 2013/0272353 | A1* | 10/2013 | Fox | H04L 1/0003 375/222 |
| 2014/0022943 | A1* | 1/2014 | Ling | H04L 1/0009 370/254 |
| 2014/0133330 | A1* | 5/2014 | Chapman | H04L 41/0806 370/252 |
| 2015/0188653 | A1 | 7/2015 | Hanks et al. | |
| 2015/0188668 | A1* | 7/2015 | Al-banna | H04L 5/0044 370/208 |
| 2016/0044080 | A1* | 2/2016 | DuBreuil | H04N 21/8456 709/219 |
| 2016/0211983 | A1 | 7/2016 | Zhang et al. | |

OTHER PUBLICATIONS

Data-Over-Cable Service Interface Specifications, DOCSIS 1.1. Radio Frequency Interface Specification, CM-SP-RFIv1.1-C01-050907, © 1999-2005 Cable Television Laboratories, Inc., 436 pages.

Data-Over-Cable Service Interface Specifications, DOCSIS 2.0 + IPv6 Cable Modem Specification, CM-SP-DOCSIS2.0-IPv6-I04-110623, © 2009-2011 Cable Television Laboratories, Inc., 23 pages.

Data-Over-Cable Service Interface Specifications, DOCSIS 3.0, Operations Support System Interface Specification, CM-SP-OSSIv3.0-I05-071206; © 2006-2007 Cable Television Laboratories, Inc., 763 pages.

Virtualization and Network Evolution Open Networking, SDN Architecture for Cable Access Networks Technical Report, VNE-TR-SDN-ARCH-V01-150625, © 2014-2015 Cable Television Laboratories, Inc., 129 pages.

Hamzeh, B. et al., "DOCSIS 3.1: Scaling Broadband Cable to Gigabit Speeds," IEEE Communications Magazine, Mar. 2015, pp. 108-113.

Mehmood, H. et al., "Bit Loading Profiles for High-Speed Data in DOCSIS 3.1," IEEE Communications Magazine, Mar. 2015, pp. 114-120.

* cited by examiner

MULTICAST PROFILE SWITCHING METHOD, APPARATUS, AND SYSTEM

CROSS-REFERENCE TO RELATED APPLICATIONS

This application is a continuation of International Application No. PCT/CN2015/099905, filed on Dec. 30, 2015, the disclosure of which is hereby incorporated by reference in its entirety.

TECHNICAL FIELD

The present invention relates to the data communication field, and specifically, to a multicast profile switching method, an apparatus, and a system.

BACKGROUND

At present, a most widely applied coaxial cable access solution is an access networking solution based on a Data over Cable System Interface Specification (DOCSIS) technology. The DOCSIS technology mainly supports transmission of a data packet between a computer network and a cable television network, and between a cable television head-end and a user. An access data transmission system based on the DOCSIS technology is shown in FIG. 1, and includes a cable modem termination system (CMTS) device 101 and a cable modem (CM) device 102. The CMTS is an optical line terminal providing broadband access, and the CM is a terminal device. The CMTS is connected to the CM using a hybrid fiber coaxial (HFC) network in a tree form, and the CM is connected to a user. The access data transmission system provides data backhaul and downloads channels respectively using an uplink band and a downlink band of the cable television network.

In a DOCSIS standard, it is specified that a downlink data transmission channel corresponding to CMTS multicast supports 16 profiles, a downlink data transmission channel of the CM supports 4+1 profiles (four private profiles and one general profile), and an uplink data transmission channel of the CM also supports a plurality of profiles. The downlink channel is modulated using orthogonal frequency division multiplexing (OFDM), and a subcarrier is adaptively modulated. Usually, an OFDM channel whose bandwidth is 192 MHz may be divided into 4096 subcarriers or 8192 subcarriers, and carrier spacings are 50 KHz or 25 KHz respectively. Adaptively modulating the subcarrier refers to determining, according to channel quality of a corresponding adaptive channel, of a quantity of bits carried on a subcarrier. For example, channel quality at a location of number 12 subcarrier may be relatively good, and a modulation scheme of 4096 QAM is used to carry 14-bit data. However, because a channel at a location of number 3000 subcarrier is most greatly interfered, only 1024 QAM modulation can be used to carry 12-bit data. In this way, quantities of bits carried on different subcarriers are different. Therefore, multicast profiles supported by a CM using a subcarrier to transmit data are different. In this way, how to select a multicast profile is an important technology of concern.

SUMMARY

Embodiments of the present invention provide a multicast profile switching method, an apparatus, and a system, so as to dynamically switch a profile to a profile having a maximum rate and supported by a CM in a multicast group.

According to a first aspect, an embodiment of the present invention provides a multicast profile switching method. The method includes receiving a multicast profile switching request message from a cable modem termination system (CMTS), where the multicast profile switching request message includes at least a downlink channel identifier corresponding to a multicast group, an identifier of a changed multicast group member, an identifier of the multicast group, and a multicast group member change indicator. The method also includes determining a multicast profile having a maximum rate and commonly supported by all current multicast group members. The method also includes sending a multicast profile switching instruction to the CMTS when the multicast profile having the maximum rate is different from a current multicast profile that is running, where the multicast profile switching instruction is used to instruct the CMTS to perform multicast profile switching, and the multicast profile switching instruction includes at least the downlink channel identifier corresponding to the multicast group, the identifier of the multicast group, and an identifier of the current multicast profile.

In a first possible implementation of the first aspect, the sending a multicast profile switching instruction to the CMTS when the multicast profile having the maximum rate is different from a current multicast profile that is running includes: sending a multicast profile test message to the CMTS, and instructing the CMTS to perform multicast profile switching when receiving a test result that indicates all the multicast group members support the multicast profile having the maximum rate and that is fed back by the CMTS.

According to a second aspect, an embodiment of the present invention provides a cable modem termination system (CMTS). The CMTS includes a multicast group management module and a profile management module. The multicast group management module is configured to: manage a multicast group member, and send a multicast profile switching request message to the profile management module when the managed multicast group member changes, where the multicast profile switching request message includes at least a downlink channel identifier corresponding to a multicast group, an identifier of the changed multicast group member, an identifier of the multicast group, and a multicast group member change indicator. The profile management module is configured to: after receiving the multicast profile switching request message, determine a multicast profile having a maximum rate and commonly supported by all current multicast group members, where when the multicast profile having the maximum rate is different from a current multicast profile that is running, the profile management module sends a multicast profile switching instruction to the multicast group management module, the multicast profile switching instruction is used to instruct the multicast group management module to perform multicast profile switching, and the multicast profile switching instruction includes at least the downlink channel identifier corresponding to the multicast group, the identifier of the multicast group, and an identifier of the current multicast profile.

In a first possible implementation of the second aspect, the CMTS further includes a profile test module. The profile management module sends a multicast profile test message to the profile test module when the multicast profile having the maximum rate is different from a profile running in a current multicast group, where the multicast profile test message includes an identifier of the multicast profile having the maximum rate. The profile test module tests, in the current multicast group according to the received multicast profile test message, whether all multicast group members support the multicast profile having the maximum rate The profile test modules sends a determining result to the profile management module when determining that all the multicast group members support the multicast profile having the maximum rate. The profile management module sends the multicast profile switching instruction to the multicast group management module according to the determining result, to instruct the multicast group management module to perform multicast profile switching.

According to a third aspect, an embodiment of the present invention provides a multicast profile management apparatus. The apparatus includes a signal receiving module, a profile management module, and a signal sending module. The signal receiving module is configured to receive a multicast profile switching request message that is from a CMTS. The multicast profile switching request message includes at least a downlink channel identifier corresponding to a multicast group, an identifier of a changed multicast group member, an identifier of the multicast group, and a multicast group member change indicator. The profile management module is configured to: determine, according to the multicast profile switching request message received by the signal receiving module, a multicast profile having a maximum rate and commonly supported by all current multicast group members, where when the multicast profile having the maximum rate is different from a current multicast profile that is running, the profile management module sends a multicast profile switching instruction to the CMTS.

According to a fourth aspect, an embodiment of the present invention provides a multicast profile switching system. The system includes the multicast profile management apparatus described above, a cable modem termination system (CMTS), and at least one cable modem (CM).

According to a fifth aspect, an embodiment of the present invention provides a data communication apparatus. The apparatus includes a processor, a memory, and a bus system. The processor is connected to the memory using the system bus. The memory is configured to store an instruction. The processor is configured to execute the instruction stored in the memory. The processor is configured to: determine, when a managed multicast group member changes, a multicast profile having a maximum rate and commonly supported by all current multicast group members; when the multicast profile having the maximum rate is different from a profile running in a current multicast group, test, in the current multicast group, whether all multicast group members support the multicast profile having the maximum rate; send a determining result to a profile management module by using the system bus when determining that all the multicast group members support the multicast profile having the maximum rate; and perform multicast profile switching according to a multicast profile switching instruction fed back by the profile management module.

By using the solution in the embodiments, when a multicast group member (for example a CM) managed by the CMTS changes, the CMTS can dynamically switch a profile to a profile having a maximum rate and supported by a CM in a multicast group, thereby providing a better multicast profile to the CM and maximizing channel utilization.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
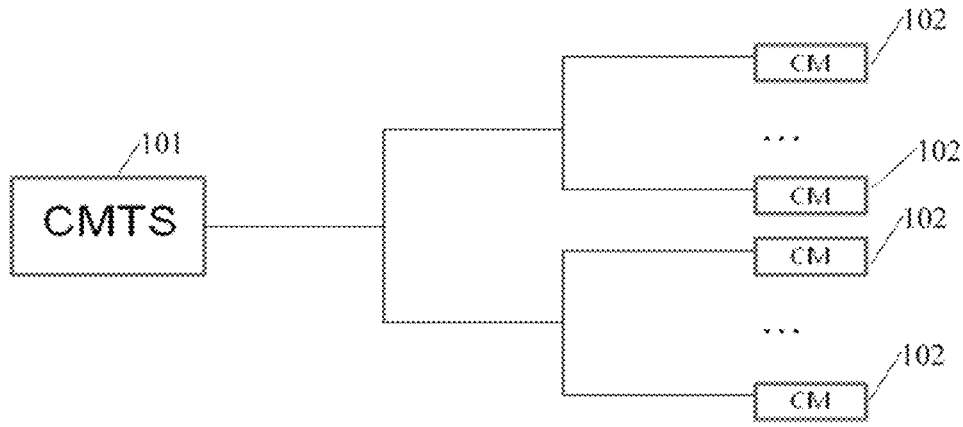
FIG. 1 is a schematic structural diagram of an access data transmission system based on a DOCSIS technology in accordance with some embodiments of the present invention.
Figure 2:
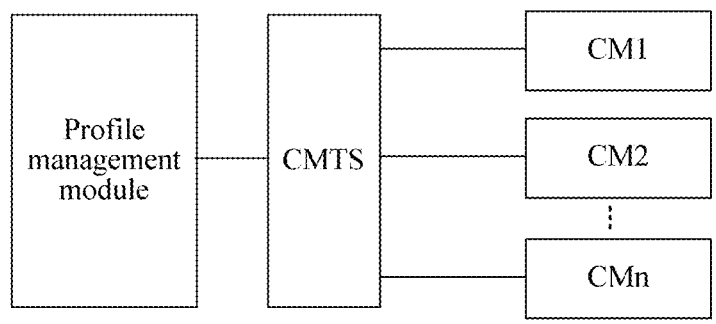
FIG. 2 is a schematic structural diagram of a multicast profile switching system according to an embodiment of the present invention.

In an embodiment of the present invention, a profile management module is introduced based on a system shown in FIG. 1, to form a multicast profile switching system. As shown in FIG. 2, the system includes a profile management module, a CMTS, and at least one CM. The profile management module is configured to manage a multicast profile supported by a downlink data transmission channel of the at least one CM that accesses the CMTS. The profile management module may exist as a separate module or application outside the CMTS, or may be integrated into the CMTS. As a multicast group member, the CM performs data transmission according to a parameter of a multicast profile.

Figure 3:
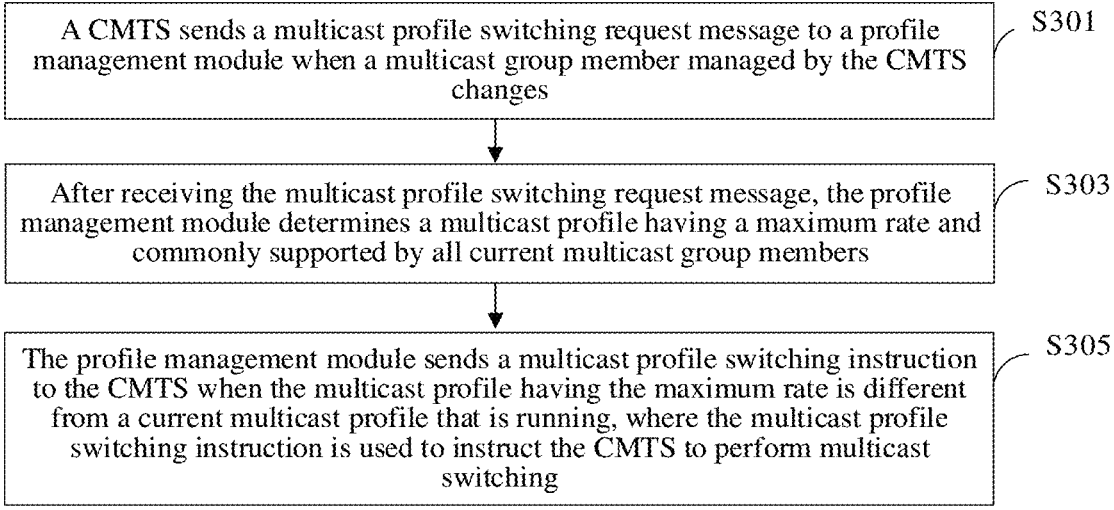
FIG. 3 is a flowchart of a multicast profile switching method according to an embodiment of the present invention.

The following specifically describes specific switching steps. As shown in FIG. 3, an embodiment of the present invention provides a multicast profile switching method, including the following steps.

Step 301: A CMTS sends a multicast profile switching request message to a profile management module when a multicast group member managed by the CMTS changes. The multicast profile switching request message includes at least a downlink channel identifier corresponding to a multicast group, an identifier of the changed multicast group member, an identifier of the multicast group, and a multicast group member change indicator.

The identifier of the changed multicast group member may be a MAC address of a CM or another mark that uniquely identifies a CM. The downlink channel identifier corresponding to the multicast group is used to uniquely identify a downlink channel corresponding to the multicast group. The identifier of the multicast group is used to uniquely identify the multicast group in which a member changes.

A moment when the multicast group member managed by the CMTS changes specifically is a moment when a new CM joins the multicast group or at least one existing multicast group member leaves the multicast group. The multicast group member change indicator specifically is a multicast group member joining or leaving indicator.

Step 303: After receiving the multicast profile switching request message, the profile management module determines a multicast profile having a maximum rate and commonly supported by all current multicast group members.

Step 305: The profile management module sends a multicast profile switching instruction to the CMTS when the multicast profile having the maximum rate is different from a current multicast profile that is running. The multicast profile switching instruction is used to instruct the CMTS to perform multicast profile switching, and the multicast profile switching instruction includes at least the downlink channel identifier corresponding to the multicast group, the identifier of the multicast group, and an identifier of the current multicast profile.

To ensure high operation reliability of the multicast profile, step 305 may further include the following steps (not shown in FIG. 3).

Step 3051: The profile management module sends a multicast profile test message to the CMTS when the multicast profile having the maximum rate is different from a profile running in a current multicast group. The multicast profile test message includes an identifier of the multicast profile having the maximum rate.

Step 3052: The CMTS tests, in the current multicast group according to the received multicast profile test message, whether all multicast group members support the multicast profile having the maximum rate; and sends a determining result to the profile management module when determining that all the multicast group members support the multicast profile having the maximum rate.

Step 3053: The profile management module sends the multicast profile switching instruction to the CMTS according to the determining result, to instruct the CMTS to perform multicast profile switching.

It should be noted that, in step 3052, if it is determined that at least one multicast group member does not support the multicast profile having the maximum rate, after the determining result is sent to the profile management module, the profile management module does not instruct the CMTS to perform multicast profile switching.

Similarly, when the multicast profile having the maximum rate is the same as the profile running in the current multicast group, the profile management module also does not send a switching instruction to the CMTS to perform multicast profile switching.

With reference to a general procedure of a multicast group, in this embodiment of the present invention, the multicast profile switching method is provided in terms of how and when to select a multicast profile. According to this embodiment, when the multicast group member (for example a CM) managed by the CMTS changes, that is, when a new CM joins the multicast group or a CM leaves the multicast group, the CMTS can dynamically switch a profile to a profile having a maximum rate and supported by a CM in a multicast group, thereby providing a better multicast profile to the CM and maximizing channel utilization.

Figure 4:
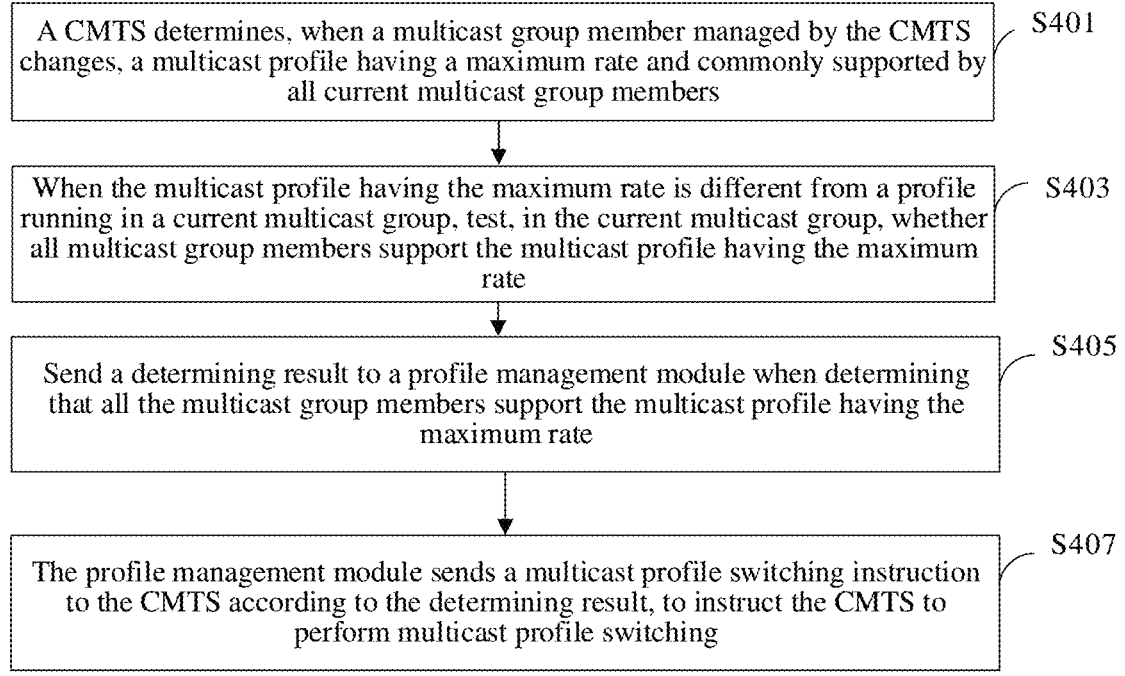
FIG. 4 is a flowchart of another multicast profile switching method according to an embodiment of the present invention.

Alternatively, before step 305, when the multicast group member managed by the CMTS changes, the CMTS sends a multicast profile switching request message to the profile management module, and then, the profile management module determines the multicast profile having the maximum rate and commonly supported by all the current multicast group members, the foregoing steps can be changed as follows. When the multicast group member managed by the CMTS changes, the CMTS directly determines the multicast profile having the maximum rate and commonly supported by all the current multicast group members. Specific steps are shown in FIG. 4, including the following.

Step 401: The CMTS determines, when a multicast group member managed by the CMTS changes, a multicast profile having a maximum rate and commonly supported by all current multicast group members.

Step 403: When the multicast profile having the maximum rate is different from a profile running in a current multicast group, test, in the current multicast group, whether all multicast group members support the multicast profile having the maximum rate.

Step 405: Send a determining result to a profile management module when determining that all the multicast group members support the multicast profile having the maximum rate.

Step 407: The profile management module sends a multicast profile switching instruction to the CMTS according to the determining result, to instruct the CMTS to perform multicast profile switching.

It should be noted that, in step 405, if it is determined that at least one multicast group member does not support the multicast profile having the maximum rate, after the determining result is sent to the profile management module, the profile management module does not forcibly instruct the CMTS to perform multicast profile switching.

Similarly, in step 403, when the multicast profile having the maximum rate is the same as the profile running in the current multicast group, no test needs to be performed in the current multicast group, and the following step 405 and step 407 do not need to be performed either.

Figure 5:
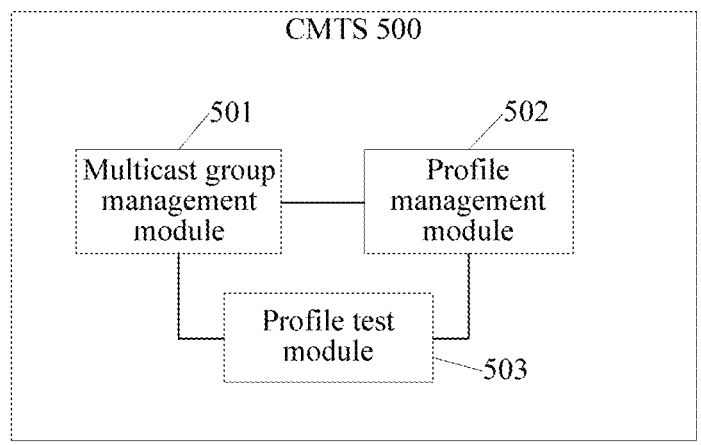
FIG. 5 is a schematic structural diagram of a CMTS according to an embodiment of the present invention.

As shown in FIG. 5, an embodiment of the present invention further provides a CMTS 500. The CMTS includes a multicast group management module 501 and a profile management module 502.

The multicast group management module 501 is configured to: manage a multicast group member, and send a multicast profile switching request message to the profile management module when the managed multicast group member changes. The multicast profile switching request message includes at least a downlink channel identifier corresponding to a multicast group, an identifier of the changed multicast group member, an identifier of the multicast group, and a multicast group member change indicator.

The profile management module 502 is configured to: after receiving the multicast profile switching request message, determine a multicast profile having a maximum rate and commonly supported by all current multicast group members.

When the multicast profile having the maximum rate is different from a current multicast profile that is running, the profile management module 502 sends a multicast profile switching instruction to the multicast group management module 501. The multicast profile switching instruction is used to instruct the multicast group management module 501 to perform multicast profile switching. The multicast profile switching instruction includes at least the downlink channel identifier corresponding to the multicast group, the identifier of the multicast group, and an identifier of the current multicast profile.

Further, the CMTS further includes a profile test module 503.

The profile management module 502 sends a multicast profile test message to the profile test module 503 when the multicast profile having the maximum rate is different from a profile running in a current multicast group. The multicast profile test message includes an identifier of the multicast profile having the maximum rate.

The profile test module 503 tests, in the current multicast group according to the received multicast profile test message, whether all multicast group members support the multicast profile having the maximum rate; and sends a determining result to the profile management module 502 when determining that all the multicast group members support the multicast profile having the maximum rate.

The profile management module 502 sends the multicast profile switching instruction to the multicast group management module according to the determining result, to instruct the multicast group management module 501 to perform multicast profile switching.

Further, after the profile test module 503 determines that at least one multicast group member does not support the multicast profile having the maximum rate, and sends the determining result to the profile management module, the profile management module 502 does not forcibly instruct the multicast group management module 501 to perform multicast profile switching.

Similarly, when determining that the multicast profile having the maximum rate is the same as the profile running in the current multicast group, the profile management module 502 does not instruct the multicast group management module 501 to perform multicast profile switching either.

It should be noted that the multicast group management module, the profile management module, and the profile test module in the CMTS in this embodiment may be implemented by hardware, software, or a combination thereof. When some of the foregoing functions are implemented by software, the three modules are not limited to three separate units, and the module division is merely logical function division. In addition, the CMTS in this embodiment completes the steps in the foregoing method with reference to the hardware or software of the CMTS. For more specific content, refer to FIG. 3 and the corresponding embodiment. To avoid repetition, details are not described herein again.

Figure 6:
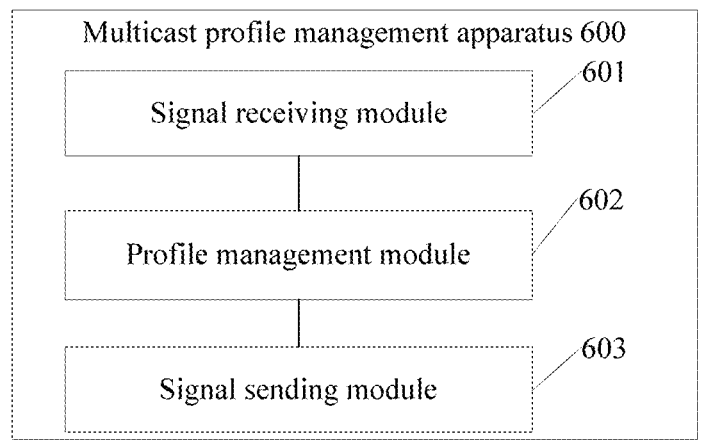
FIG. 6 is a schematic structural diagram of a multicast profile management apparatus according to an embodiment of the present invention.

As shown in FIG. 6, an embodiment of the present invention further provides a multicast profile management apparatus 600, including a signal receiving module 601, a profile management module 602, and a signal sending module 603.

The signal receiving module 601 is configured to receive a multicast profile switching request message that is from a CMTS. The multicast profile switching request message includes at least a downlink channel identifier corresponding to a multicast group, an identifier of a changed multicast group member, an identifier of the multicast group, and a multicast group member change indicator.

The profile management module 602 is configured to: determine, according to the multicast profile switching request message received by the signal receiving module 601, a multicast profile having a maximum rate and commonly supported by all current multicast group members, where when the multicast profile having the maximum rate is different from a current multicast profile that is running, the profile management module 602 sends a multicast profile switching instruction to the CMTS.

Further, the profile management module 602 is further configured to: send a multicast profile test message to the CMTS when the multicast profile having the maximum rate is different from a profile running in a current multicast group; and instruct the CMTS to perform multicast profile switching when receiving a test result that indicates all the multicast group members support the multicast profile having the maximum rate and that is fed back by the CMTS.

Further, when receiving a test result that indicates at least one multicast group member does not support the multicast profile having the maximum rate and that is fed back by the CMTS, the profile management module 602 does not instruct the CMTS to perform multicast profile switching.

Similarly, when determining that the multicast profile having the maximum rate is the same as the profile running in the current multicast group, the profile management module 602 does not instruct the CMTS to perform multicast profile switching either.

An actual product of the signal receiving module 601 and the signal sending module 603 in this embodiment is a transceiver.

It should further be noted herein that the profile management module is built in the CMTS in FIG. 5 and the embodiment of FIG. 5, and in FIG. 6 and the embodiment of FIG. 6 the profile management module is externally disposed as a separate apparatus. Usually, an internal or external profile management module is used separately. However, in some scenarios, an internal profile management module and an external profile management module of a CMTS can exist at the same time. Both of the two profile management modules can independently complete corresponding multicast optimization and adjustment. However, at a moment, only one profile management module acts to perform a corresponding action of profile switching, and the other profile management module keeps data synchronization with the profile management module that performs the corresponding action, so as to ensure that related multicast profile data in the internal profile management module and the external profile management module of the CMTS is the same.

Figure 7:
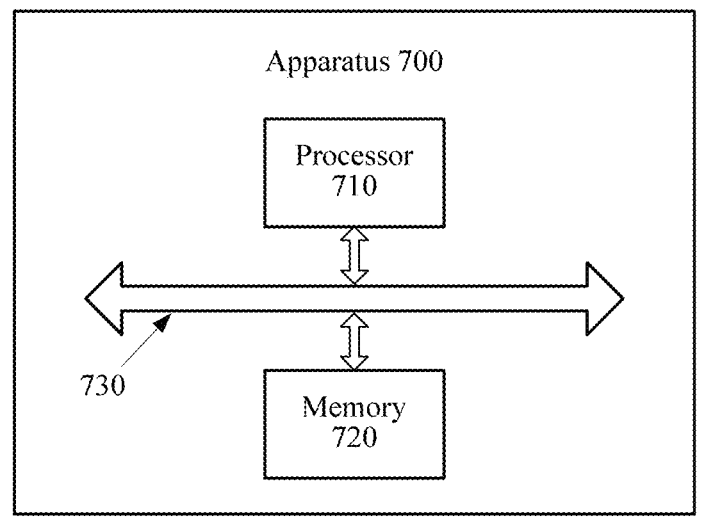
FIG. 7 is a schematic structural diagram of a data communication apparatus according to an embodiment of the present invention.

As shown in FIG. 7, an embodiment of the present invention further provides a data communication apparatus 700. The apparatus 700 includes a processor 710, a memory 720, and a bus system 730. The processor 710 is connected to the memory 720 using the system bus 730. The memory 720 is configured to store an instruction. The processor 710 is configured to execute the instruction stored in the memory 720. The processor 710 is configured to: determine, when a managed multicast group member changes, a multicast profile having a maximum rate and commonly supported by all current multicast group members; when the multicast profile having the maximum rate is different from a profile running in a current multicast group, test, in the current multicast group, whether all multicast group members support the multicast profile having the maximum rate; send a determining result to a profile management module by using the system bus when determining that all the multicast group members support the multicast profile having the maximum rate; and perform multicast profile switching according to a multicast profile switching instruction fed back by the profile management module.

For a specific execution procedure of the processor 710, refer to the descriptions corresponding to the flowchart shown in FIG. 3 or FIG. 4, and details are not described herein again.

It should be understood that, in this embodiment of the present invention, the processor 710 may be a central processing unit (CPU), or the processor 710 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any normal processor, or the like.

The memory 720 may include a read-only memory and a random access memory, and provide an instruction and data to the processor 710. A part of the memory 720 may further include a non-volatile random access memory. For example, the memory 720 may further store information of a device type.

The bus system 730 may further include a power bus, a control bus, a status signal bus, and the like, in addition to a data bus. However, for clear description, various types of buses in the figure are marked as the bus system 730.

In an implementation process, steps in the foregoing methods can be implemented by using a hardware integrated logical circuit in the processor 710, or by using instructions in a form of software. The steps of the method disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 720, and the processor 710 reads information in the memory 720 and completes the steps in the foregoing methods in combination with hardware of the processor. To avoid repetition, details are not described herein again.

Persons of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

In addition, the terms "system" and "network" may be used interchangeably in this specification.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
   receiving, from a cable modem termination system (CMTS) when a member of a multicast group has changed, a multicast profile switching request message, wherein the multicast profile switching request message comprises a downlink channel identifier corresponding to the multicast group, an identifier of the changed multicast group member, an identifier of the multicast group, and a multicast group member change indicator;
   determining a multicast profile having a maximum rate and commonly supported by all current multicast group members after the change of the member of the multicast group; and
   when the multicast profile having the maximum rate is different from a current multicast profile that is running, sending a multicast profile switching instruction to the CMTS, wherein the multicast profile switching instruction instructs the CMTS to perform multicast profile switching, and the multicast profile switching instruction comprises the downlink channel identifier corresponding to the multicast group, the identifier of the multicast group, and an identifier of the current multicast profile.

2. The method according to claim 1, wherein when the multicast profile having the maximum rate is different from the current multicast profile that is running, sending the multicast profile switching instruction to the CMTS comprises:
   sending a multicast profile test message to the CMTS; and
   when receiving a test result from the CMTS that indicates all the multicast group members support the multicast profile having the maximum rate, instructing the CMTS to perform multicast profile switching.

3. The method according to claim 1, wherein the multicast group member change indicator is a multicast group member joining or leaving indicator, and the multicast group member change indicator indicates that a new cable modem (CM) has joined the multicast group or an existing multicast group member has left the multicast group.

4. The method according to claim 1, wherein the identifier of the changed multicast group member is a media access control (MAC) address of the changed multicast group member or another mark that uniquely identifies the changed multicast group member.

5. A method, comprising:
when a multicast group member of a multicast group managed by a cable modem termination system (CMTS) has changed, determining, by the CMTS, a multicast profile having a maximum rate commonly supported by all current multicast group members of the multicast group after the multicast group member has changed;
when the multicast profile having the maximum rate is different from a profile running in the multicast group, testing, in the multicast group, whether all current multicast group members support the multicast profile having the maximum rate; and
when determining that all current multicast group members support the multicast profile having the maximum rate, sending a determining result to a profile manager.

6. The method of claim 5, wherein the profile manager is comprised in the CMTS.

7. The method according to claim 5, wherein the profile manager is external to the CMTS.

8. A cable modem termination system (CMTS), comprising:
a processor;
a signal transmitter; and
a non-transitory computer-readable memory coupled to the processor and storing program instructions which, when executed by the processor, cause the processor to:
manage a member of a multicast group;
when the managed member of the multicast group changes, send, using the transmitter, a multicast profile switching request message to a profile manager, wherein the multicast profile switching request message comprises a downlink channel identifier corresponding to the multicast group, an identifier of the changed member of the multicast group, an identifier of the multicast group, and a multicast group member change indicator;
after the profile manager receives the multicast profile switching request message, determining a multicast profile having a maximum rate and commonly supported by all current multicast group members after the managed member of the multicast group changes; and
when the multicast profile having the maximum rate is different from a current multicast profile that is running, performing multicast profile switching.

9. The CMTS according to claim 8, wherein the program instructions, when executed by the processor, further cause the processor to:
when the multicast profile having the maximum rate is different from a profile running in the multicast group, testing, in the multicast group, whether all current multicast group members support the multicast profile having the maximum rate; and
when determining that all current multicast group members support the multicast profile having the maximum rate, performing multicast profile switching.

10. The CMTS according to claim 8, wherein the program instructions, when executed by the processor, further cause the processor to:

when determining that at least one current multicast group member does not support the multicast profile having the maximum rate, not performing multicast profile switching.

11. The CMTS according to claim 8, wherein the multicast group member change indicator is a multicast group member joining or leaving indicator, and indicates that a new cable modem (CM) joins the multicast group or at least one existing multicast group member leaves the multicast group.

12. The CMTS according to claim ii, wherein the identifier of the changed multicast group member is a media access control (MAC) address of the changed managed member of the multicast group or another mark that uniquely identifies the changed managed member of the multicast group.

13. A multicast profile management apparatus, comprising:
a processor;
a signal transmitter;
a signal receiver; and
a non-transitory computer-readable memory coupled to the processor and storing program instructions which, when executed by the processor, cause the processor to:
receive, using the signal receiver, a multicast profile switching request message from a cable modem termination system (CMTS), wherein the multicast profile switching request message comprises a downlink channel identifier corresponding to a multicast group, an identifier of a changed multicast group member, an identifier of the multicast group, and a multicast group member change indicator;
determine, according to the received multicast profile switching request message, a multicast profile having a maximum rate and commonly supported by all current multicast group members of the multicast group; and
when the multicast profile having the maximum rate is different from a current multicast profile that is running in the multicast group, sending, using the signal transmitter, a multicast profile switching instruction to the CMTS.

14. The multicast profile management apparatus according to claim 13, wherein the program instructions, when executed by the processor, further cause the processor to:
send, using the signal transmitter, a multicast profile test message to the CMTS when the multicast profile having the maximum rate is different from a profile running in the multicast group; and
instruct the CMTS to perform multicast profile switching when receiving, using the receiver, a test result that indicates all current multicast group members support the multicast profile having the maximum rate that is fed back by the CMTS.

15. The multicast profile management apparatus according to claim 14, wherein the program instructions, when executed by the processor, further cause the processor to:
when receiving a test result that indicates at least one multicast group member does not support the multicast profile having the maximum rate that is fed back by the CMTS, not instructing the CMTS to perform multicast profile switching.

* * * * *

UNITED STATES PATENT AND TRADEMARK OFFICE
CERTIFICATE OF CORRECTION

PATENT NO.         : 10,659,244 B2
APPLICATION NO.    : 16/019183
DATED              : May 19, 2020
INVENTOR(S)        : Yanbin Sun Page 1 of 1

It is certified that error appears in the above-identified patent and that said Letters Patent is hereby corrected as shown below:

In the Claims

In Column 12, Line 11, Claim 12, delete "claim ii" and insert --claim 11--.

Signed and Sealed this
Eleventh Day of August, 2020

Andrei Iancu
*Director of the United States Patent and Trademark Office*